(12) United States Patent
Davis

(10) Patent No.: US 6,990,442 B1
(45) Date of Patent: Jan. 24, 2006

(54) PARSING WITH CONTROLLED TOKENIZATION

(75) Inventor: James F. Davis, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 942 days.

(21) Appl. No.: 09/960,775

(22) Filed: Sep. 21, 2001

Related U.S. Application Data

(60) Provisional application No. 60/308,299, filed on Jul. 27, 2001.

(51) Int. Cl.
  G06F 17/27 (2006.01)
  G06F 17/28 (2006.01)
(52) U.S. Cl. .......................... 704/9; 704/256; 704/257
(58) Field of Classification Search ................ 717/143; 704/9, 256, 257
  See application file for complete search history.

(56) References Cited

U.S. PATENT DOCUMENTS

| | | | |
|---|---|---|---|
| 5,585,793 A * | 12/1996 | Antoshenkov et al. ........ | 341/51 |
| 5,651,095 A * | 7/1997 | Ogden ........................ | 704/260 |
| 6,523,172 B1 * | 2/2003 | Martinez-Guerra et al. . | 717/143 |
| 6,714,939 B2 * | 3/2004 | Saldanha et al. ........... | 707/102 |

\* cited by examiner

Primary Examiner—Tālivaldis Ivars Šmits
Assistant Examiner—Abdelali Serrou
(74) Attorney, Agent, or Firm—Withrow & Terranova, PLLC

(57) ABSTRACT

The present invention provides a parsing technique wherein a parsing process provides feedback to a tokenizer to select an appropriate sub-tokenizer process corresponding to a grammar rule being implemented by the current parsing state. Each parsing state will select a corresponding sub-tokenizer process to tokenize a corresponding portion of an input stream for a message to be parsed. Each sub-tokenizer process is preferably unique and configured to provide only tokens capable of being processed by the grammar rule being implemented in the corresponding parser state. If the input string cannot be tokenized as required by the corresponding grammar rule implemented by the parser state, an error message is delivered. The parser process will move from one state to another, based on processing the respective tokens, until the input stream for the message is completely parsed.

23 Claims, 5 Drawing Sheets

PARSING WITH CONTROLLED TOKENIZATION

This application claims the benefit of Provisional Application Ser. No. 60/308,299, filed Jul. 27, 2001, the disclosure of which is incorporated herein by reference.

FIELD OF THE INVENTION

The present invention relates to parsing information, and in particular to parsing protocols with controlled tokenization.

BACKGROUND OF THE INVENTION

Many of today's communication systems use text-based signaling protocols. The messages of these protocols are pure ASCII text and do not contain information intended to be interpreted as binary values. The syntax of such messages is specified by way of formal grammars. For the receiver to understand such a message, the message must be syntactically analyzed and broken into its constituent parts. The act of doing so is traditionally referred to as "parsing," and software processes designed to do so are referred to as "parsers."

A significant amount of effort is devoted to parsing. Such effort is mainly directed to the design of compilers, and more recently, natural language translators. There are many tools available for producing parsers. These tools are typically geared to producing parsers for computer languages, in the form of compilers.

Parsing tools have traditionally operated in a two-step fashion. First, a text string is scanned and grouped into manageable pieces called tokens. In the English language sentence, "Jack ran up the hill," "ran" would be tokenized as a verb, "the" as an article, and so forth. This phase of parsing is typically referred to as "tokenizing," and is based on the theory of regular languages and finite state automata.

After being tokenized, the string is syntactically analyzed by the parser to determine whether the sequence of tokens is grammatically correct. This phase is based on the theory of context free languages and push down automata. Traditionally, the parser is not allowed to direct, or otherwise influence, the tokenizing process. This constraint is imposed in part by the decomposition of the process into two steps with different theories underlying each step, and in part by the need of such parsers for "look ahead" tokens.

In protocols such as the media gateway control protocol (MGCP) defined in Request for Comments (RFC) 2705 of the Internet Architecture Board (IAB), Megaco, as defined in RFCs 2885 and 2886, and many others used in telecommunications, there are many instances where tokenization cannot take place independently of syntax analysis. In MGCP, the string "AB05" could represent an identifier, such as part of an endpoint name, or it could represent a hexadecimal number. The correct interpretation of the string would depend on the context in which the string was encountered.

For an English language analogy of this problem, consider the following sentences:
a) "Honey, I forgot to duck;" and
b) "The duck does not like honey."

In sentence a), "duck" is a verb, and the tokenizer should identify it as such. In sentence b), "duck" is a noun, and this also should be identified as such by the tokenizer. Obviously, the tokenizer cannot classify "duck" as a verb or noun based on the character string "duck" alone. More information is needed, and in particular, syntactical information is needed. The parser would thus have to tell the tokenizer what kind of token to expect.

Two methods have traditionally been employed to handle this problem. First, a parser can be hand-written. Here, the translation from the protocol grammar to the parser source code is done completely by the parser designer or programmer. The result is a specialized, one-of-a-kind parser. Second, standard tools can be used but with significant special cases introduced in the tokenizer. The result is the duplication of a large part of the parser logic within the tokenizer.

Both of these approaches have significant drawbacks, particularly from the viewpoint of maintainability. The first option produces a parser where the connection between the grammar and the parser code is unclear. A small revision of protocol grammar may require a major re-write of the parser. For the second option, a standard tool maintains the connection between the grammar and the parser code, but it is completely ignorant of the duplicated logic within the tokenizer. Making changes to such a parser results in a highly error-prone software engineering task.

In essence, traditional parsing systems using a tokenizer 10 and parser 12 may be illustrated as shown in FIG. 1. A text-based input string 14 is provided to the tokenizer 10, wherein the string is broken down into its respective tokens 16. The tokens 16 are provided to the parser 12, which processes the tokens 16 and provides a corresponding parser output 18 based on the processed tokens 16. There is no reciprocal interplay between the tokenizer 10 and the parser 12.

As such, there is a need for a parsing system wherein the tokenizer and parsing processes can communicate with one another in an effective manner to facilitate parsing without prior knowledge of syntax associated with the string. Further, there is a need for a parsing system that is readily maintained and capable of allowing modifications in the tokenizer or parsing processes without having any significant impact on each other.

SUMMARY OF THE INVENTION

The present invention provides a parsing technique wherein a parsing process provides feedback to a tokenizer to select an appropriate sub-tokenizer process corresponding to a grammar rule being implemented by the current parsing state. Each parsing state will select a corresponding sub-tokenizer process to tokenize a corresponding portion of an input stream for a message to be parsed. Each sub-tokenizer process is preferably unique and configured to provide only tokens capable of being processed by the grammar rule being implemented in the corresponding parser state. If the input string cannot be tokenized as required by the corresponding grammar rule implemented by the parser state, an error message is delivered. The parser process will move from one state to another, based on processing the respective tokens, until the input stream for the message is completely parsed.

The parsing technique of the present invention is particularly useful in parsing text-based protocols, wherein strings with identical text within the message may represent or correspond to different information. By allowing the parsing process to control the tokenizer, information may be parsed in an efficient manner. Modification or maintenance to the protocol, tokenizer processes, and parser processes may be implemented in a manageable fashion.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The present invention removes the traditional separation between tokenization and parsing processes and allows the parser to tell the tokenizer what to expect for a subsequent portion of a string. A tokenizer used to implement the tokenization process is broken into multiple sub-tokenizers corresponding to subsets of grammar rules. The sub-tokenizer corresponding to a particular subset of grammar rules will recognize tokens satisfying the respective rules. Additional details follow.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
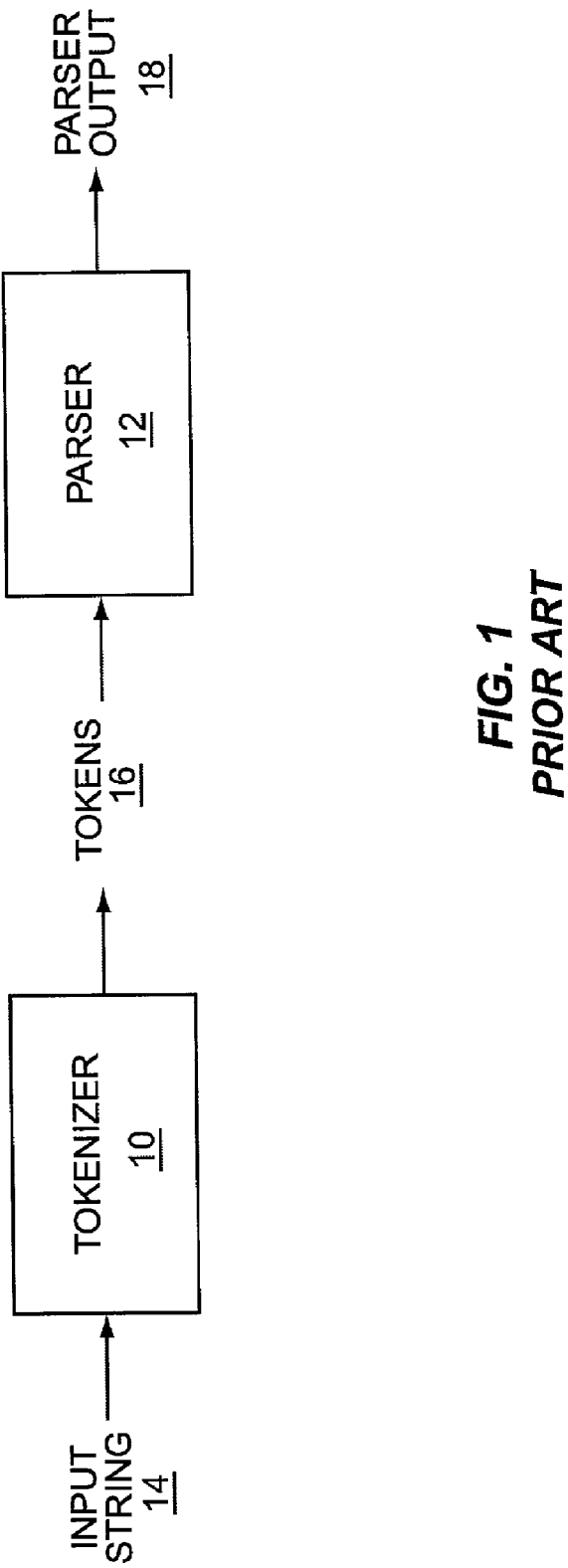
FIG. 1 is a diagram illustrating the basic flow of a traditional parsing process of the prior art.
Figure 2:
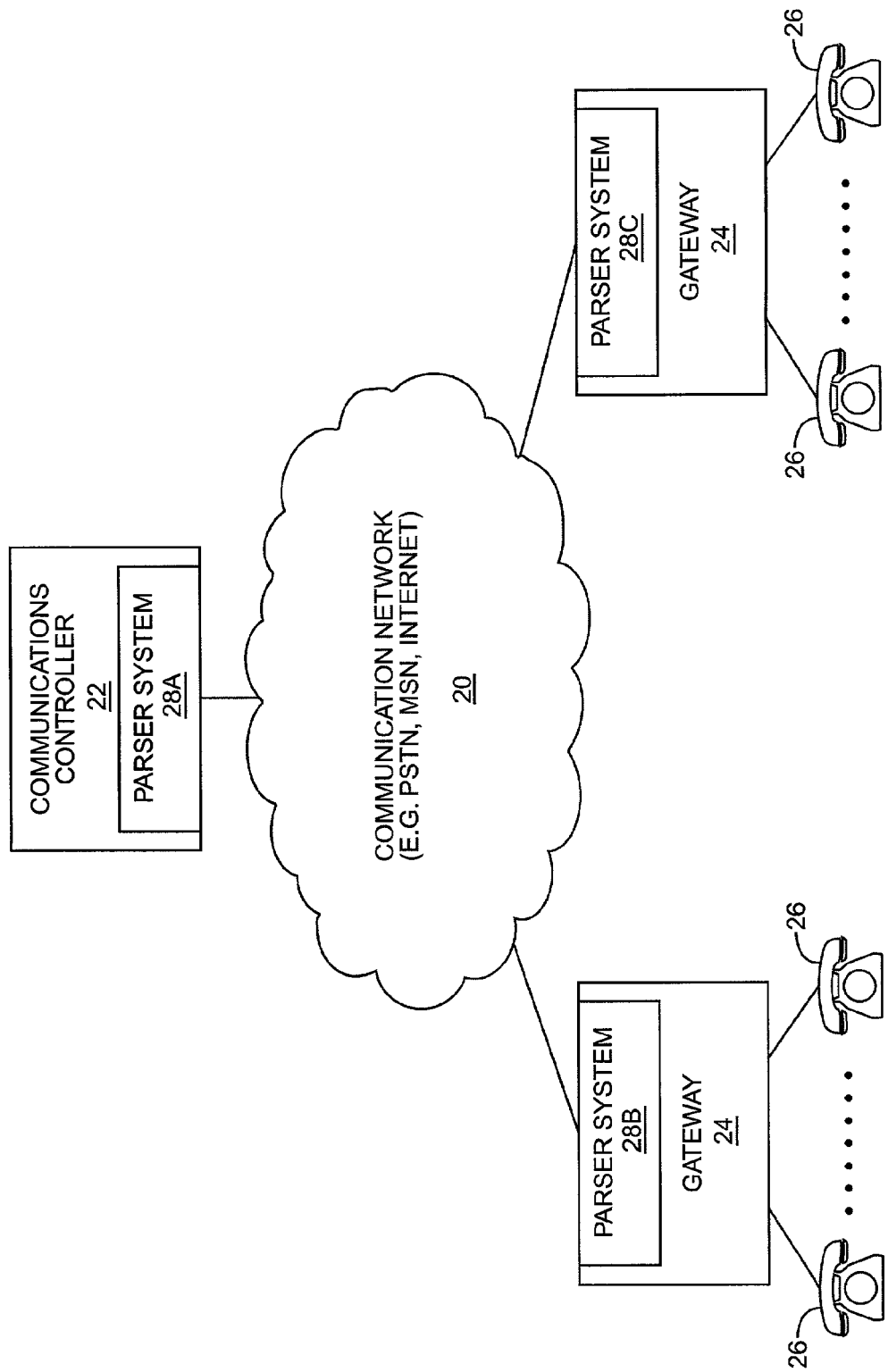
FIG. 2 illustrates an exemplary communication system incorporating parsing technology according to one embodiment of the present invention.

Turning now to FIG. 2, an exemplary communication system is illustrated having a central communication network 20, which may include any combination of the public switched telephone network (PSTN), mobile switching networks (MSN), and packet-switched networks, such as the Internet. Devices within and associated with the communication network 20, such as a communications controller 22 and gateways 24, communicate with one another to provide instructions and information to one another using text-based protocols. These devices will communicate with or support other communication devices, such as terminals 26. When communicating using these text-based protocols, each communicating device will require a parser system 28A, 28B, 28C, to process and parse the incoming text-based protocol messages in order to allow the associated control systems to understand and react to the messages in an appropriate manner.

Figure 3:
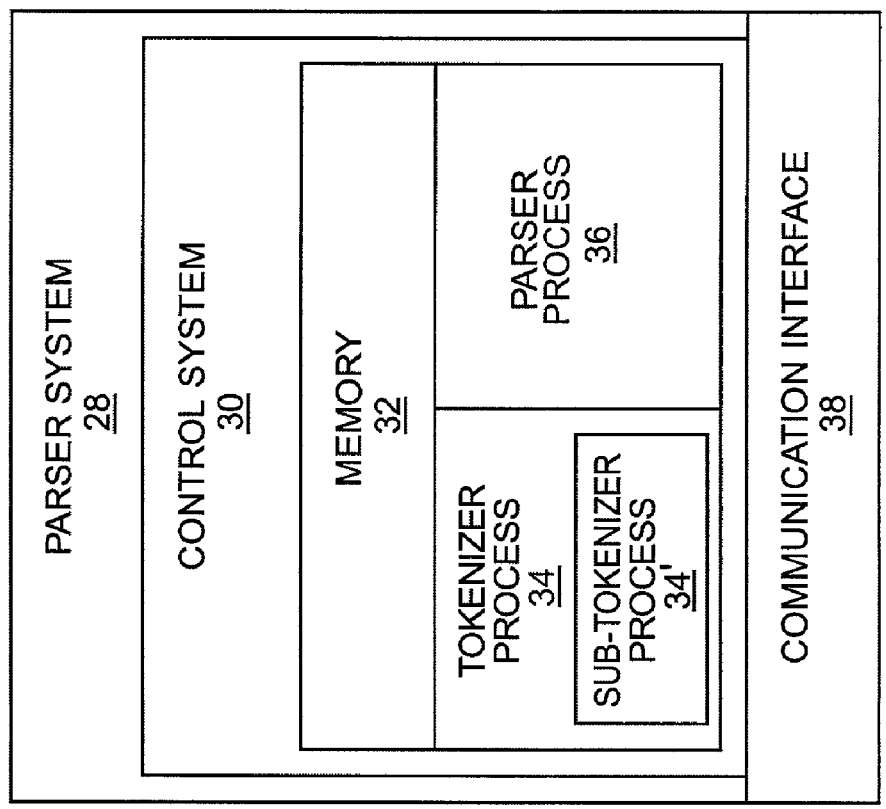
FIG. 3 is a block representation of a parser system according to one embodiment of the present invention.

As illustrated in FIG. 3, the parser system 28 may be implemented with a control system 30 having sufficient memory 32 containing the requisite tokenizer process 34 and parser process 36 for operation. The tokenizer process 34 will include sub-tokenizer processes 34'. Each sub-tokenizer process 34' will provide a tokenizer function corresponding to a grammar rule being implemented by the parser process 36, as described in detail below. The control system 30 is preferably associated with a communication interface 38 adapted to receive and perhaps transmit messages according to the particular protocols. The tokenizer and parser processes 34, 36 may be implemented together on one control system 30, or on separate control systems that are dedicated to the particular process or capable of providing these processes in association with other processes.

The concepts of the present invention are best understood in light of an example pseudo text-based protocol. The following pseudo protocol illustrates some of the difficulties that the present invention solves. The main difficulty as shown by the following example is that of ambiguous tokens, which cannot be identified without knowing the syntactical content of the token.

The alphabet for this example pseudo protocol consists of the characters "a", "b" and "c". A message for the pseudo protocol consists of three parts.

1. A message type indicator, which is the first character of the message and must be either "a" or "b."
2. A parameter type indicator, which consists of the second and third characters of the message. The parameter types are: "bc" and "cb."
3. The message parameter, which is a string of a's, b's and c's.

Not all combinations of message types and parameter types are valid. Message type "a" can have parameter types "bc" and "cb", but message type "b" can only have parameter type "bc". Thus, the string "abcabc" is a valid message. So is "bbcabc." But "bcbabc" and "cabcba" are not valid.

A formal grammar defining the valid strings for the pseudo protocol follows. The grammar is written in a form and notation commonly used in the theory of formal languages.

| Grammar | |
|---|---|
| A | → a B |
|   | → b C |
| B | → bc D |
|   | → cb D |
| C | → bc D |
| D | → [abc]+ |

In writing the grammar, non-terminals (names of rules) are denoted by upper case letters, and terminals (characters or strings of characters) are denoted by lower case letters. The other symbols used ("→", "[", "]", and "+") are called metasymbols.

Rules for the pseudo protocol are to be interpreted as follows. The metasymbol "→" means "consists of" or "is made up of". The first alternative of the first rule (Rule A), that is, A→a B, says that for a string to match this alternative of Rule A, it must begin with the character "a" and be followed by a string that matches Rule B.

Rule A has two alternatives: A→a B and A→b C. For a string to match Rule A, it must match one of the two alternatives. In the listing of the grammar rules above, the practice is followed of not repeating the symbol on the left hand side of the "→" (the rule name symbol) for the rule's second and further alternatives. This is a standard convention. Another common way of denoting rule alternatives is:

A→(a B)|(b C), where the metasymbols "(" and ")" are grouping symbols and the metasymbol "|" means "or".

The terminal symbols of this grammar are the characters "a", "b", the strings "bc", "cb", and a class of strings described by a regular expression: [abc]+. This regular expression represents any string consisting of a's, b's and c's that is at least one character in length.

One way of looking at Grammar 1 is as a recipe for generating valid messages in the protocol. To see that the string "abcabc" is a valid message, we can derive that string using the grammar rules:

| A | ⇒ aB | (using the rule A → a B) |
|---|---|---|
|  | ⇒ abcD | (using the rule B → bc D) |
|  | ⇒ abcabc | (using the rule D → [abc]+) |

The symbolism "A ⇒aB" is read "A derives aB," or "aB is derived from A."

The string "bbcabc" is also a valid message, as seen by the derivation:

A⇒bC⇒bbcD⇒bbcabc wherein the first step is derived via the rule A→bC, the second step via C→bcD, and the last step via D→[abc]+. The fact that a sequence of derivations going from A to the string "bbcabc" exists is symbolized by A ⇒* bbcabc.

As discussed previously, standard parser generation tools are aimed at programming languages. They are designed to work in a two step fashion: first, the raw input will be tokenized, that is, substrings of the input will be recognized as individual entities and grouped into classes called tokens; second, the parser proper will examine this sequence of tokens to determine if the input is syntactically correct and to extract the meaning of the input.

As noted, the tokenizing and parsing steps of the prior art work independently. The tokenizer 10 has no information about the parser's current syntactic state. To generate a tokenizer 10 and parser 12 pair with standard tools, two input files are created (or one file with two parts): the token definitions and the grammatical definitions.

| Input to tokenizer generator: |
|---|
| Token_a = "a" |
| Token_b = "b" |
| Token_bc = "bc" |
| Token_cb = "cb" |
| Token_P = [abc]+ |

| Input to parser generator: |
|---|
| A -> Token_a B; |
| -> Token_b C; |
| B -> Token_bc D; |
| -> Token_cb D; |
| C -> Token_bc D; |
| D -> Token_P; |

The tokenizer 10 built by a standard tool would fail to produce the desired tokens 16. Such a tokenizer 10 traditionally finds the longest match in the input to its set of tokens 16. While the string abcabc should be tokenized as the sequence Token_a (a) Token_bc (bc) Token_P (abc), a prior art tokenizer 10 would tokenize the entire string abcabc as Token_P.

The concept behind the present invention is to partition the tokenizer 10 into separate sub-tokenizer processes 34', one for each grammar rule. Thus, the first rule,
A->Token_a B;
 ->Token_b C;

uses a sub-tokenizer process 34' that accepts only Token_a and Token_b, the second rule,
B->Token_bc D;
 ->Token_cb D;

uses a sub-tokenizer process 34' that only accepts Token_bc and Token_cb, and so forth.

Figure 4:
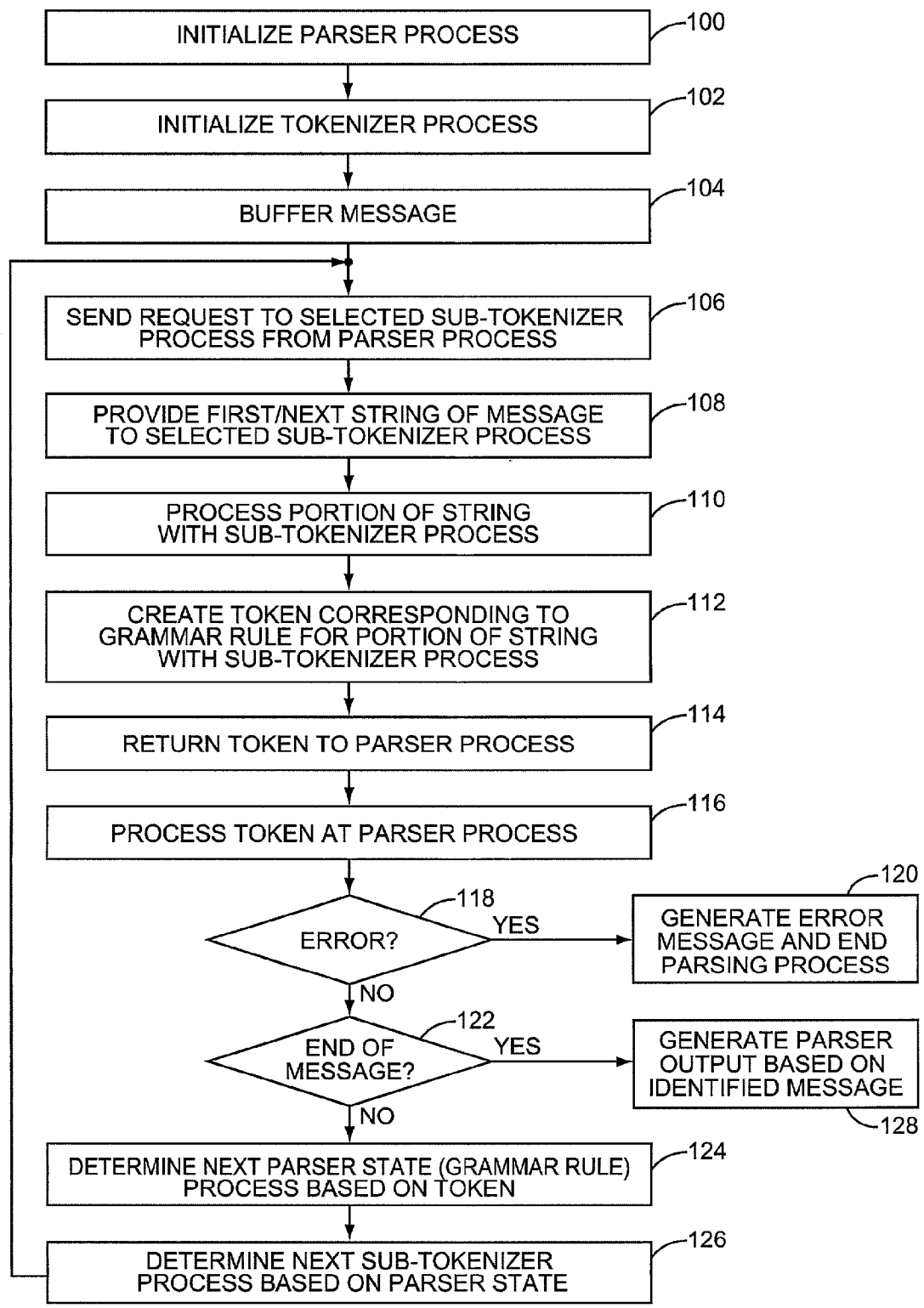
FIG. 4 is a flow diagram outlining a basic process according to one embodiment of the present invention.

Thus, the present invention maintains the separation of a tokenizer process 34 and a parser process 36, but allows these processes to actively communicate with one another during parsing. The flow diagram of FIG. 4 outlines an exemplary process flow according to one embodiment of the present invention.

During operation, the parser and tokenizer processes 34, 36 are initialized (steps 100 and 102), and a protocol message containing a text-based string is buffered for processing (step 104). Assume that the parser process 36 is initialized to a first state, which directs the parser process 36 to send a request to a selected sub-tokenizer process 34' (step 106), which will access the first, or next, sub-string of the buffered message (step 108).

The sub-tokenizer process 34' will process the portion of the string according to the grammar rule associated with that particular sub-tokenizer process 34' (step 110). The sub-tokenizer process 34' will then create a token corresponding to the grammar rule corresponding to portion of the string being processed (step 112). Then, the sub-tokenizer process 34' will return the token to the parser process 36 (step 114), which will process the token (step 116).

Notably, the sub-tokenizer processes 34' are preferably selecting characters within the string to form a token for a particular rule. The particular rule is actually carried out at a corresponding state in the parser process 36. If the sub-tokenizer process 34' cannot generate a token for the parser process 36 at a given state, an error message may be returned instead of a token.

If an error message is sent to the parser process 36 from the sub-tokenizer process 34' (step 118), the parser process 36 will generate an error message and end parsing for the particular message, which will trigger an error processing routine (step 120).

If a proper token was returned, and the end of the message being processed has not been reached (step 122), the parser process 36 will determine the next parser state to be entered, which corresponds to one of the grammar rules (step 124). The sub-tokenizer process 34' from which to request the next token then is determined based on the identified parser state (step 126). The process will repeat by having the parsing process 36 step from one state to another based on tokens returned from the various sub-tokenizer processes 34' within the tokenizer process 34. Each sub-tokenizer process 34', upon request from the parser process 36, will essentially receive a request from the parser process 36 based on a select rule, and create and return a token for the given rule being implemented by the parser process 36. When the end of the message is reached (step 122), the parser process 36 will generate an appropriate action based on the processed message (step 128).

Figure 5:
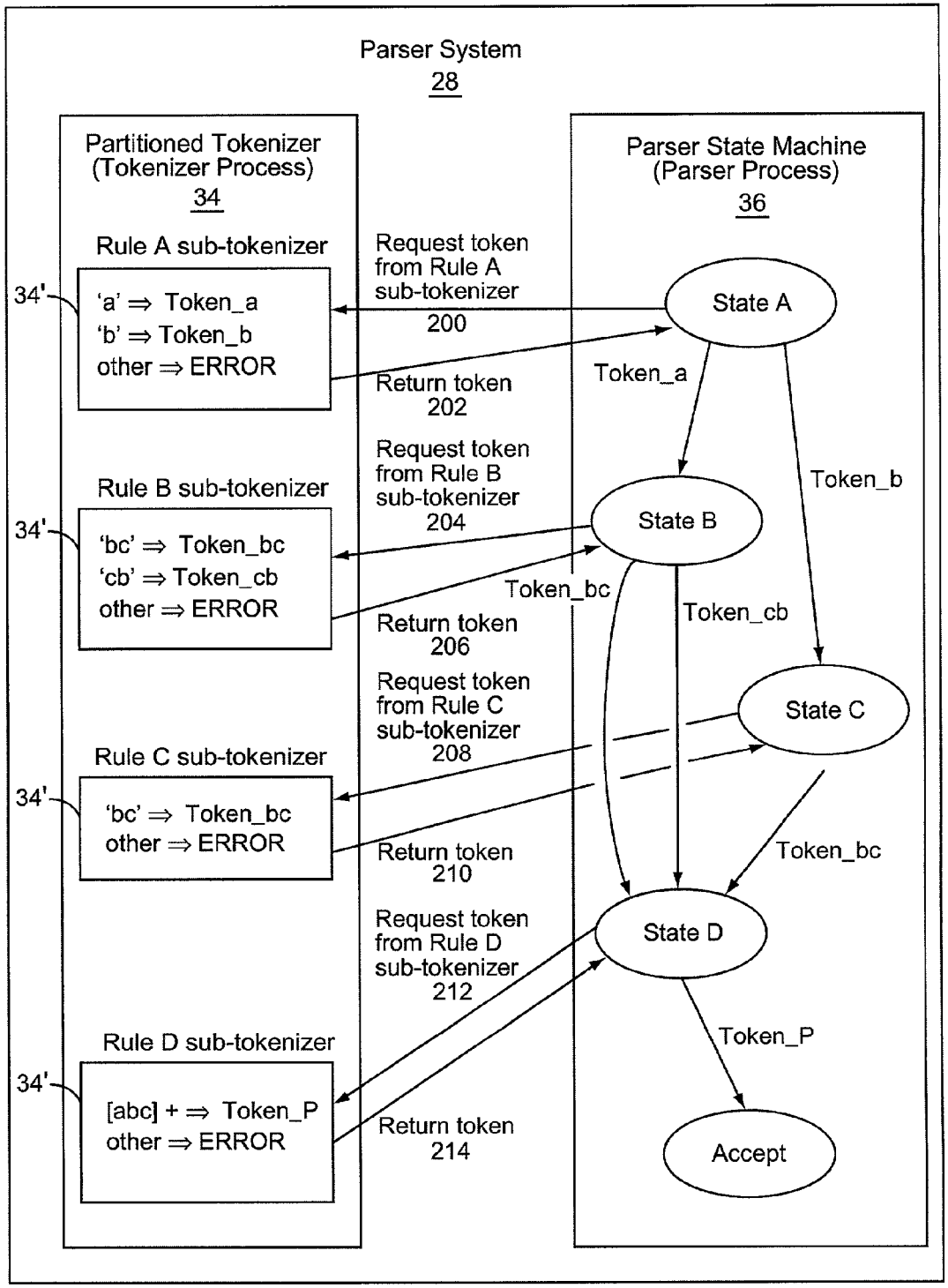
FIG. 5 is a communication diagram of the operation of an exemplary embodiment of the present invention.

FIG. 5 provides a graphical representation of the tokenizer process 34 and a parser process 36 configured to implement parsing according to the exemplary grammar for the pseudo protocol outlined above. The tokenizer process 34 is broken into four sub-tokenizer processes 34' corresponding to tokens for rules A through D. Based on the requisite input to the tokenizer process 34, the respective sub-tokenizer processes 34' will provide either a corresponding token or an error message to an associated state of the parser process 36. Each state is preferably configured to request a token from a particular sub-tokenizer process 34', receive the requested token from the sub-tokenizer process 34', and operate on the token according to the corresponding grammar rule.

The parser process 36 is shown having five states, States A through D and Accept. States A through D correspond to grammar rules A through D. Accordingly, State A will request and process tokens corresponding to a message type indicator. States B and C will request and process tokens corresponding to parameter indicators, and State D will process tokens representing message parameters. In this example, the parser process 36 is implemented using a parser state machine, and will simply track through and repeat the various states as necessary to fulfill the grammar rules. As indicated, State A will request a token from the Rule A sub-tokenizer process 34', which will return a corresponding token (steps 200 and 202). Similarly, States B, C, and D will request and receive corresponding tokens from the corresponding sub-tokenizer processes 34' (steps 204 through 214). Once a message is entirely tokenized and processed by the various states in the parser process 36, the message may be accepted, which will result in the parser system 28 initiating a select action. These actions may be controlling associated peripherals, interfaces, and the like, as well as sending additional messages and the like, as those skilled in the art will appreciate.

Concepts of the present invention may be implemented in a number of ways, including creating new code to fulfill all functions, as well as modifying existing software tools to implement select functionality. For example, the concepts of the present invention may be implemented, at least in part, using the public domain software tool Flex.

In such an embodiment, the partitioning of the tokenizer process 34 is accomplished by using Flex's "exclusive start state" feature. A one-to-one correspondence is set up between exclusive start states and the sub-tokenizer processes 34', and hence between the exclusive start states and the parsing states. Flex provides a mechanism to recognize the various tokens 16 and, when a particular token 16 is recognized, to execute user provided code appropriate to that token 16 (an action). The rules describing the tokens 16 and their corresponding actions are produced by the separate tool and are used as input to Flex, which, in turn, produces the tokenizer process 34, with the parser's state machine imbedded in it, via actions.

An exemplary input to the separate tool to produce a parser for the pseudo protocol follows:

```
; comment
;
#terminals
Token_a    a
Token_b    b
Token_bc   bc
Token_cb   cb
Token_P    [abc]+
;
```

-continued

```
; comment
;
#rules
A   -> Token_a    B  => {msgTypeA_Encountered( );};
    -> Token_b    C  => {msgTypeB_Encountered( );};
B   -> Token_bc   D  => {parmTypeBC_Beginning( );};
    -> Token_cb   D  => {parmTypeCB_Beginning( );};
C   -> Token_bc   D  => {parmTypeBC_Beginning( );};
D   -> Token_P       => {parmameterEncountered( );accept( );};
```

The tool generates a Flex input file from this, with both the user's actions (e.g., msgTypeA_Encountered( )) and the parser state machine control functions (e.g., yy_push_state(B), BEGIN D-see listing below) embedded as Flex user actions. An exemplary output of the tool follows:

```
%option yylineno
%option stack
%option noyywrap
%{
#include "ToyParser.h"
int yyFlexLexer::yylex( )
{
    LexerError( "yyFlexLexer::yylex invoked but %option yyclass used")
    return 0;
}
#define YY_DECL int ToyParser::yylex( )
#undef YY_INPUT
#define YY_INPUT(b, r, ms) (r = string_yyinput (b, ms))
#define yyterminate( ) return −1
%}
Token_a    a
Token_b    b
Token_bc   bc
Token_cb   cb
Token_P    [abc]+
%x A
%x B
%x C
%x D
%%
{Token_a}        { yy_push_state (B);msgTypeA_Encountered( );}
{Token_b}        { yy_push_state (C);msgTypeB_Encountered( );}
(.|\n)           {return(parseError(A));}
<A>{Token_a}     { BEGIN B;msgTypeA_Encountered( );}
<A>{Token_b}     { BEGIN C;msgTypeB_Encountered( );}
<A>(.|\n)        {return(parseError(A));}
<B>{Token_bc}    { BEGIN D;parmTypeBC_Beginning( );}
<B>{Token_cb}    { BEGIN D;parmTypeCB_Beginning( );}
<B>(.|\n)        {return(parseError(B));}
<C>{Token_bc}    { BEGIN D;parmTypeBC_Beginning( );}
<C>(.|\n)        {return(parseError(C));}
<D>{Token_P}     { yy_pop_state( );parameterEncountered( );
                   accept( );}
<D>(.|\n)        {return(parseError(D)); }
%%
```

The separate software tool may be a regular grammar parser generator (RGPG) tool, and is a program that generates parsers for ASCII text-based protocols. The input for the tool consists of a file of grammar rules describing the protocol syntax. The form of these rules is that of a regular grammar, a standard idea in the theory of formal languages. Each rule may have an action associated with it. The actions specify what the parser 36 is to do upon encountering the grammar construct defined by that rule. The actions are encoded along with the rules in the input file.

The actions usually take the form of a C++ function call or Java method call. The output of the tool is a lexical specification file, which is then input to the public domain Unix tool Flex. This produces the C++ or Java source code for the parser. The source code is then compiled by a C++ or Java compiler to produce the executable parser code. It should be noted that the use of Flex is a matter of convenience and not essential to the concepts or implementation of the present invention. For example, the tool may be re-written to produce the source code for the compiler directly.

Those skilled in the art will recognize improvements and modifications to the preferred embodiments of the present invention. All such improvements and modifications are considered within the scope of the concepts disclosed herein and the claims that follow.

What is claimed is:

1. A computer readable medium comprising software for instructing a computer to:
   a) provide a parser process having a plurality of states, each state implementing a rule in a defined grammar; and
   b) provide a tokenizer process having a plurality of sub-tokenizer processes corresponding to the plurality of states in the parser process, each sub-tokenizer process adapted to tokenize a portion of an input string to generate a token corresponding to the rule implemented by one of the plurality of states in the parser process, wherein the parser process selects one of the plurality of sub-tokenizer processes to tokenize the portion of the input string based on a current one of the plurality of states.

2. The computer readable medium of claim 1 wherein the parser process is adapted to move from one of the plurality of states to another based on the token received from a corresponding one of the sub-tokenizer processes.

3. The computer readable medium of claim 2 wherein the parser process is adapted to generate an action for at least one of the plurality of states based on the token received from the corresponding one of the sub-tokenizer process.

4. The computer readable medium of claim 1 wherein the tokenizer process receives the input string, which is broken into subparts and tokenized by respective ones of the sub-tokenizer processes.

5. The computer readable medium of claim 1 wherein the plurality of sub-tokenizer processes are adapted to return an error to the parser process when the portion of the input string cannot generate a token corresponding to the rule implemented by the corresponding one of the plurality of states.

6. The computer readable medium of claim 1 wherein the input string is a text based protocol.

7. A system for parsing comprising:
   a) an interface for receiving an input string; and
   b) a control system associated with the interface and adapted to provide:
      i) a parser process having a plurality of states, each state implementing a rule in a defined grammar; and
      ii) a tokenizer process having a plurality of sub-tokenizer processes corresponding to the plurality of states in the parser process, each sub-tokenizer process adapted to tokenize the portion of the input string to generate a token corresponding to the rule implemented by one of the plurality of states in the parser process, wherein the parser process selects one of the plurality of sub-tokenizer processes to tokenize a portion of the input string based on a current one of the plurality of the states.

8. The system of claim 7 wherein the parser process is adapted to move from one of the plurality of states to another based on the token received from a corresponding one of the sub-tokenizer processes.

9. The system of claim 8 wherein the parser process is adapted to generate an action for at least one of the plurality of the states based on the token received from the corresponding one of the sub-tokenizer process.

10. The system of claim 7 wherein the tokenizer process receives the input string, which is broken into subparts and tokenized by respective ones of the sub-tokenizer processes.

11. The system of claim 7 wherein the plurality of sub-tokenizer processes are adapted to return an error to the parser process when the portion of the input string cannot generate a token corresponding to the rule implemented by the corresponding one of the plurality of the states.

12. The system of claim 7, wherein the input string is a text based protocol.

13. A method for parsing comprising:
   a) providing a parser process having a plurality of states, each state implementing a rule in a defined grammar;
   b) providing a tokenizer process having a plurality of sub-tokenizer processes corresponding to the plurality of states in the parser process, each sub-tokenizer process adapted to tokenize a portion of an input string to generate a token corresponding to the rule implemented by one of the plurality of states in the parser process, wherein the parser process selects one of the plurality of sub-tokenizer processes to tokenize a portion of the input string based on a current one of the plurality of states.

14. The computer method of claim 13 wherein the parser process is adapted to move from one of the plurality of states to another based on the token received from a corresponding one of the sub-tokenizer processes.

15. The method of claim 14 wherein the parser process is adapted to generate an action for at least one of the plurality of states based on the token received from a corresponding one of the sub-tokenizer process.

16. The method of claim 13 wherein the tokenizer process receives the input string, which is broken into subparts and tokenized by respective ones of the sub-tokenizer processes.

17. The method of claim 13 wherein the plurality of sub-tokenizer processes are adapted to return an error to the parser process when the portion of the input string cannot generate a token corresponding to the rule implemented by the corresponding one of the plurality of states.

18. The method of claim 13 wherein the input string is a text based protocol.

19. A method for parsing comprising:
   a) selecting one of a plurality of sub-tokenizing processes to tokenize a portion of an input string based on a current parsing state;
   b) tokenizing the portion of the input string to generate a token corresponding to a grammar rule implemented by the current parsing state;
   c) processing the token according to the grammar rule of the current parsing state with the selected sub-tokenizing process;
   d) moving to a subsequent parsing state based on processing the token according to the grammar rule of the current parsing state; and
   e) repeating steps a through d until the input string is parsed.

20. The method of claim 19 further comprising generating an action based on processing the token according to the grammar rule of the current parsing state.

21. The method of claim 19 wherein the selecting step further comprises selecting a portion of a remainder of the input string corresponding to the grammar rule implemented by the current parsing state.

22. The method of claim 19 further comprising generating an error message when the portion of the input string cannot generate a token corresponding to the grammar rule of the current parsing state.

23. The method of claim 19 wherein the input string is a text based protocol.

* * * * *